United States Patent [19]

Tomizuka

[11] Patent Number: 4,696,557

[45] Date of Patent: Sep. 29, 1987

[54] COLLAPSIBLE OVERHEAD PROJECTOR

[75] Inventor: Mitsuo Tomizuka, Kanagawa, Japan

[73] Assignee: Ricoh Company, Ltd., Tokyo, Japan

[21] Appl. No.: 888,374

[22] Filed: Jul. 23, 1986

[30] Foreign Application Priority Data

Jul. 31, 1985 [JP] Japan ................................ 60-169339

[51] Int. Cl.[4] ................................................ G03B 21/16

[52] U.S. Cl. ................................ 353/66; 353/DIG. 4; 353/119

[58] Field of Search ............... 353/65, 66, 67, DIG. 3, 353/DIG. 4, 119, 38, DIG. 5, DIG. 6

[56] References Cited

U.S. PATENT DOCUMENTS 2,767,611 10/1956 Fitzgerald ................ 353/DIG. 3 X
3,059,529 10/1962 Lucas ........................ 353/DIG. 3 X
3,176,578 4/1965 Bolsey ....................... 353/DIG. 3 X
3,209,646 10/1965 Appeldurn et al. ...... 353/DIG. 3 X
3,516,733 6/1970 Lucas ........................ 353/DIG. 4 X
3,525,566 8/1970 Altman ...................... 353/DIG. 4 X
3,711,194 8/1973 Wilson ....................... 353/DIG. 3 X
4,565,430 1/1986 Grunwald ................ 353/DIG. 4 X
4,588,271 5/1986 Emura ............................. 353/119 X

*Primary Examiner*—Harry W. Haroian
*Attorney, Agent, or Firm*—Oblon, Fisher, Spivak, McClelland, & Maier

[57] ABSTRACT

A Fresnel lens is mounted on a base in the form of a thin rectangular plate to be placed on a flat table. A document to be projected is put on the Fresnel lens. A main projector body housing a power supply is pivotally mounted on one end of the base. A head having a light source and a mirror is angularly movably coupled to a post arm which is angularly movably or telescopically coupled to the main projector body. When not in use, the base, the main projector body, the head, and the post arm are collapsed and combined into a single block body for easy transportation and storage.

14 Claims, 6 Drawing Figures

14A
14
A
12
B
2
13
11
C
9A
SW1 SW2
10
9
8
3
4
7
D
1B
1A
6A
6
1
40
6B
1C

F I G. 3
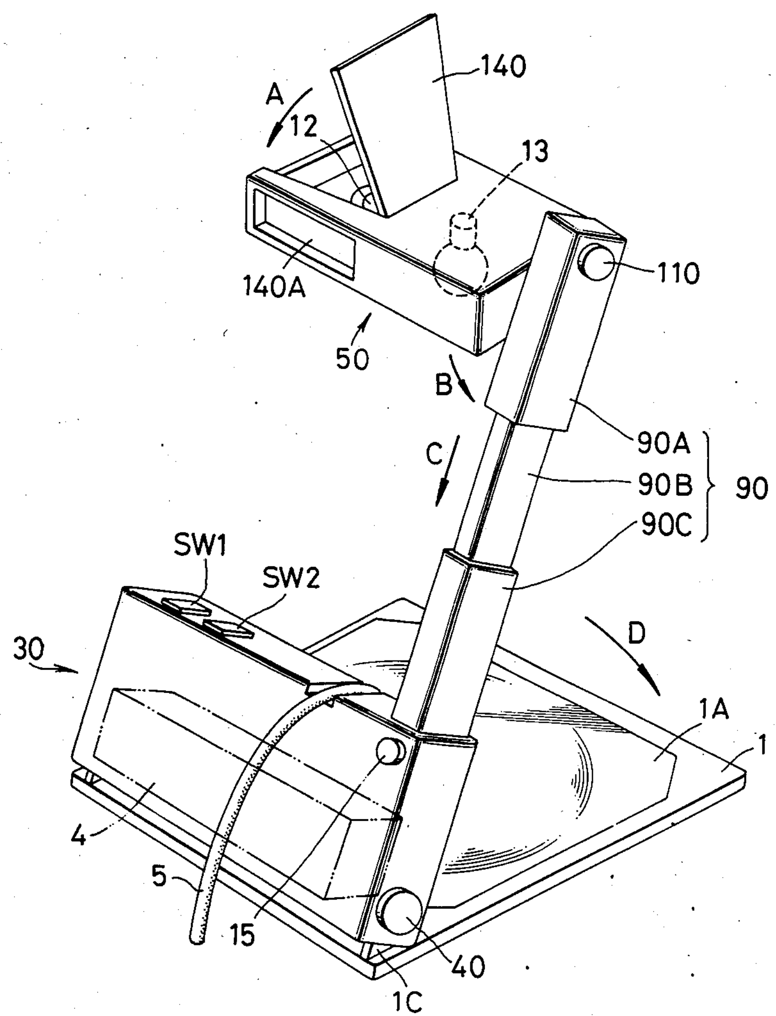

F I G. 5
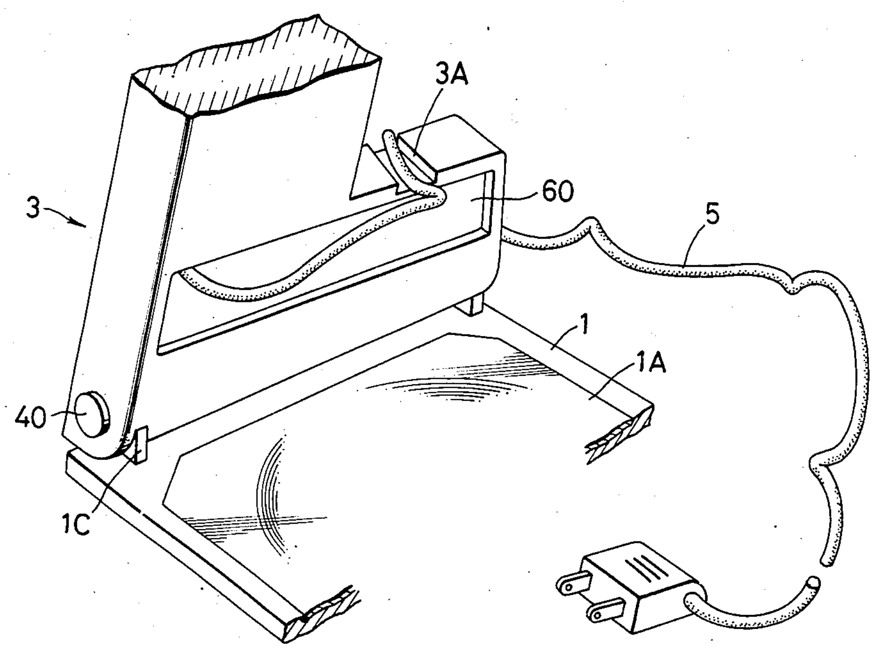
F I G. 6
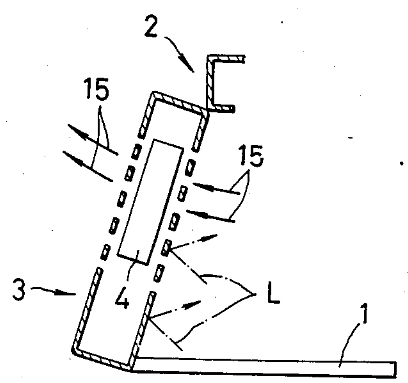

COLLAPSIBLE OVERHEAD PROJECTOR

BACKGROUND OF THE INVENTION

The present invention relates to an overhead projector.

One conventional overhead projector includes a base supporting an entire projector device and serving as a document table for placing a document thereon, and a head accommodating a light source therein. The base and the head are positioned in confronting relation by a substantially vertical post.

The base is the largest member among other components of the overhead projector. The base houses a power supply including a transformer and a cord, and includes a Fresnel lens mounted in an upper portion thereof. The base serves as a main projector body. The head houses a lens, a mirror, and a lamp.

With the known arrangement, however, since the base and the head are fixed to the post as a unitary structure, the overhead projector cannot be handled easily for transportation and storage, and takes up a relatively large space.

Inasmuch as the base is relatively thick, the document table would be too high to change documents easily if the overhead projector were located on the top of an ordinary office desk. Therefore, a support table dedicated only for supporting the overhead projector is required to make the overhead projector convenient to use.

SUMMARY OF THE INVENTION

It is an object of the present invention to provide an overhead projector which is collapsible into a smaller size for transportation and storage and which can easily be used without a dedicated support table.

The above object can be achieved by providing an overhead projector including a post as a main projector body, and a head and a base which are pivotally movably coupled to the post, the post, the head, and the base being collapsible into a compact unitary assembly. The overhead projector also includes a power supply mounted in the post. Therefore, the base is of a thin structure. Since the post, the head, and the base are collapsible into a small overall size, the overhead projector of the invention can conveniently be transported and stored.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a perspective view of an overhead projector, in use, according to another embodiment of the present invention;

FIG. 5 is a fragmentary perspective view of a base end of a main projector body having an alternative cord storage space; and FIG. 6 is a schematic cross-sectional view of the overhead projector, showing vent holes defined in the main projector body.

DETAILED DESCRIPTION

Figure 1:
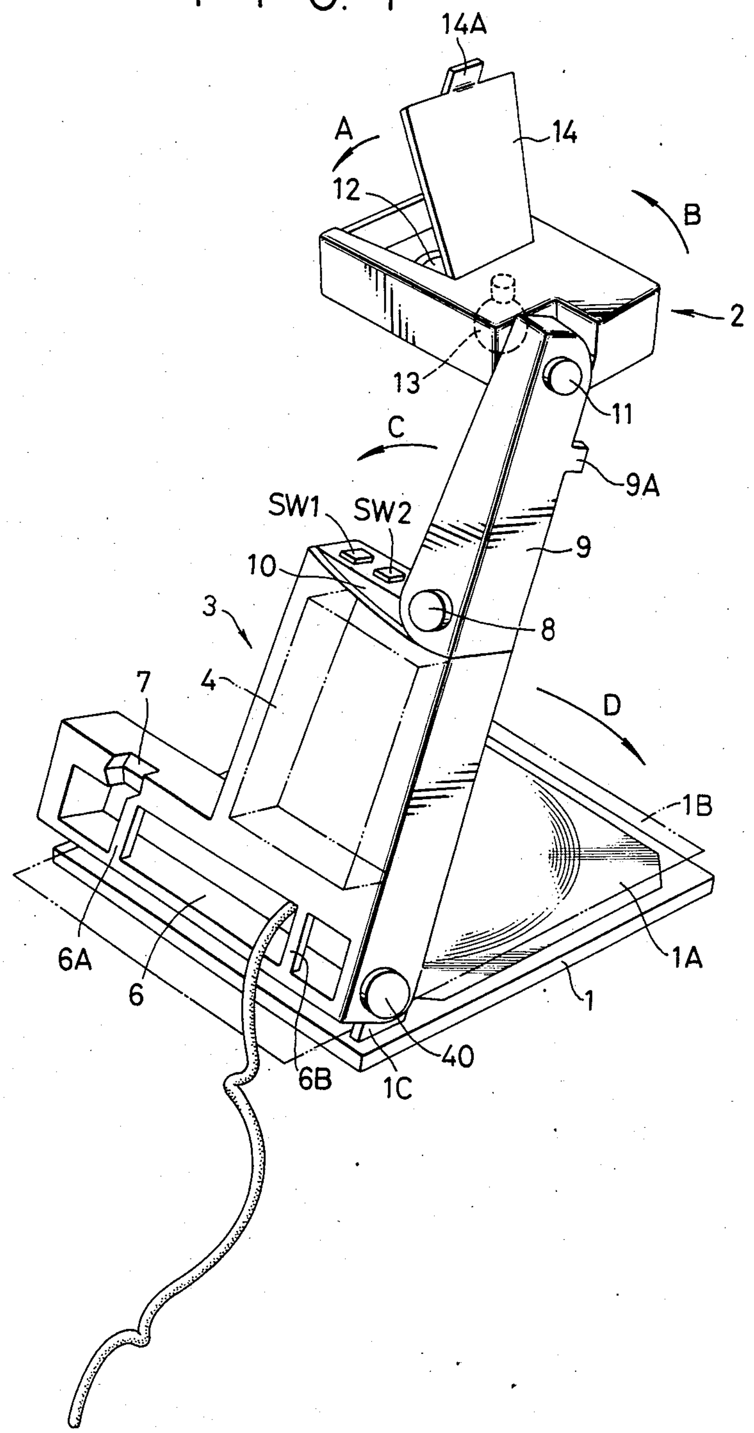
FIG. 1 is a perspective view of an overhead projector, in use, according to an embodiment of the present invention.

Like or identical parts are denoted by like or identical reference characters throughout several views.

FIG. 1 shows an overhead projector constructed in accordance with an embodiment of the present invention, the overhead projector being illustrated as being readied for use. The overhead projector includes a base 1 in the form of a thin rectangular plate with no power supply mounted therein. A Fresnel lens lA is mounted on the upper surface of the base 1 and serves as a document table for placing a document 1B thereon.

The overhead projector also includes a main projector body 3 serving as a post and angularly movably supported by hinges 40 comprising first hinge means on two spaced arms 1C (only one shown) mounted on one end of the base 1. The main projector body 3 is in the form of a substantially L-shaped box when viewed in elevation. The main projector body 3 has a hinged lower end spaced a clearance from the Fresnel lens 1A. Therefore, the document lB may be inserted through the clearance onto the Fresnel lens 1A irrespective of how the document lB is oriented.

The main projector body 3 can be locked in an angular position with respect to the base 1 by a suitable locking mechanism (not shown) associated with each of the hinges 40. The main projector body 3 is typically held at an acute angle with respect to the base 1. The main projector body 3 has a storage space housing a power supply 4 and a storage space 6 defined as an elongate recess in a lower portion thereof for accommodating a cord 5 connected to the power supply 4. The main projector body 3 has a larger thickness and width than those of the conventional projector post, and serves as a main projector component since it is the largest and heaviest among other members.

The storage space 6 for accommodating the cord 5 is of a rectangular shape and has in its opening two bridge members 6A, 6B disposed near opposite ends of the storage space 6 for preventing the stored cord 5 from being displaced out of the storage space 6. In use, the cord 5 is pulled out of the storage space 6 through an elongate slot between the bridge members 6A, 6B and connected to a power outlet (not shown). The cord 5 has a flexible sheath molded in a meandering configuration having spaced bent folds, so that the cord 5 can easily be folded into a compact mass which can easily and neatly placed into the storage space 6 through the slot between the bridge members 6A, 6B.

The main projector body 3 also has a recess 7 adjacent to the upper end of the bridge member 6A for receiving a locking tab 14A of a mirror 14 (described later).

Figure 2:
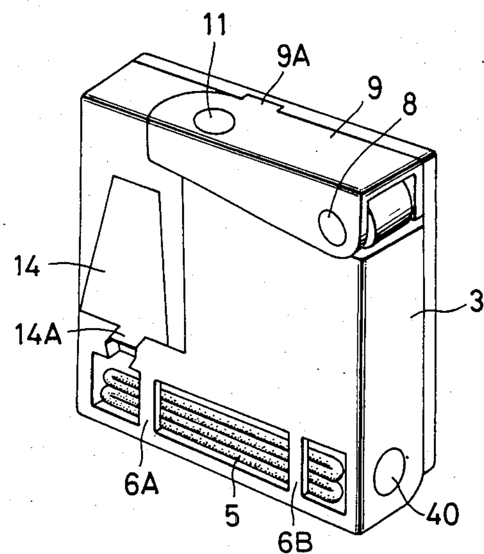
FIG. 2 is a perspective view of the overhead projector of FIG. 1 as it is collapsed.

A power supply switch SW1 and a lamp switch SW2 are mounted on an upper surface of the main projector body 3. A post arm 9 is swingably mounted by a hinge 8 comprising second hinge means on an upper end of the main projector body 3 which is positioned rightward of the switches SW1, SW2. The post arm 9 is in the form of an elongate member of a substantially C-shaped cross section (FIG. 2). When the post arm 9 is angularly moved about the hinge 8 in the direction of the arrow C, it is brought over the switches SW1, SW2 for projecting them. The hinge 8 is associated with a suitable locking mechanism (not shown) for locking the post arm 9 in the illustrated position in which an outer side wall of the post arm 9 lies flush with an outer side wall of the main projector body 3. The main projector body 3 has a step 10 alongside of the switches SW1, SW2 for receiving a side edge of the post arm 9 as it is collapsed over the switches SW1, SW2.

A head 2 in the form of a box is pivotally coupled by a hinge 11 comprising third hinge means, to the upper end of the post arm 9. The hinge 11 also has a suitable locking mechanism (not shown) for locking the head 2 so that a lens 12 disposed in the head 2 is positioned in confronting relation to the base 2. The head 2 may be locked in position so that a lower surface thereof can be held in a horizontal plane in engagement with a surface of the post arm 9. The post arm 9 and the main projector body 3 may similarly be locked by the hinges 8, 40 so that their surfaces can be held as desired in engagement with surfaces of the main projector body 3 and the base 1, respectively.

The lens 12 has an adjustment ring (not shown) on a lower side thereof for adjusting the focal point of the lens 12.

A light source 13 is also mounted in the head 2. The mirror 14 is angularly movable on the head 2 and can be locked at an angle suitable for projecting images.

With the arrangement of FIG. 1, since the power supply 4 is housed in the main projector body 3, the base 1 is of a thin shape. In use, no dedicated support table is required for the overhead projector, and the overhead projector can be placed directly on a desk and the operator can change documents to be projected quite easily on the overhead projector in a manner similar to ordinary desk work.

The power supply 4 is placed in the main projector body 3 as shown in FIG. 6. The main projector body 3 may have a number of vent holes defined in its side walls surrounding the power supply 4 for allowing air to flow through the vent holes in the direction of the arrows 15 when the main projector body 3 is erected, so that the power supply 4 contained in the main projector body 3 can be cooled. The main projector body 3 also serves to shut off light L emitted from the light source 13 and reflected by the base 1, thus preventing persons behind the main projector body 3 from being dazzled.

After the overhead projector has been used, it is collapsed in the following manner:

The cord 5 is folded into the storage space 6. Then, the mirror 14 is unlocked and turned down in the direction of the arrow A. The hinges 40, 8, 11 are unlocked as by pushing their heads.

Thereafter, the head 2 is angularly moved in the direction of the arrow B into coplanar relation to the the post arm 9, which is turned in the direction of the arrow C into covering relation to the switches SW1, SW2. At this time, the head 2 is fitted in the recess of the L-shaped main projector body 3 and hence brought into intimate contact with a side of the main projector body 3 with the locking tab 14A of the mirror 14 engaging in the recess 7, thereby keeping the mirror 14, the head 2, and the post arm 9 collapsed in position. The main projector body 3, the post arm 9, and the head 2 are combined into a rectangular block. The recess 7 is tapered to engage the locking tab 14A firmly so that the mirror 14, the head 2, and the post arm 9 can be put together tightly without any large gaps therebetween.

Then, the main projector body 3 is turned down in the direction of the arrow D onto the base 2 to bring the rectangular block into into intimate contact with the base 2. The Fresnel lens lA is now protected against damage. At this time, a hook tab 9A on the post arm 9 engages in a recess (FIG. 2) defined in a side edge of the base 1 to prevent the post arm 9 from being disengaged from the base 1. The base 1 and the head 2 are now collapsed against the main projector body 3 into a compact rectangular parallelepiped assembly as shown in FIG. 2.

The collapsed overhead projector can be transported easily and stored in a small storage space.

For using the overhead projector, it can be unfolded into the configuration of FIG. 2 by reversing the collapsing procedure described above.

FIG. 5 illustrates an alternative design for storing the cord 5. A storage recess or space 60 for the cord 5 is defined in the back of the main projector body 3 while no space is defined in the face of the main projector body 3. Since no hole is formed in the face of the main projector body 3, the appearance of the main projector body 3 is improved. In use, the cord 5 is pulled out of the storage space 60 through a guide groove 3A defined in the upper edge of the main projector body 3. Consequently, the cord 5 will not interfere with a document as it is inserted between the main projector body 3 and the base 1 onto the Fresnel lens 1A. When the main projector body 3 is turned down against the base 1, the storage space 60 is closed by the base 1. Therefore, no special cover is necessary for covering the storage space 60.

Figure 4:
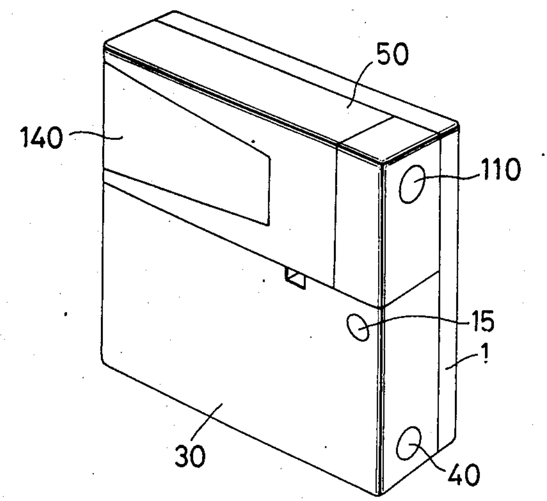
FIG. 4 is a perspective view of the overhead projector of FIG. 3 as it is collapsed.

FIGS. 3 and 4 show an overhead projector according to another embodiment of the present invention. The overhead projector shown in FIGS. 3 and 4 differs from the overhead projector of FIGS. 1 and 2 in that the post arm is telescopically extensible and contractable.

In FIG. 3, the overhead projector is unfolded in readiness for use. A head 50 is pivotally mounted by a hinge 110 on a post arm 90 in confronting relation to a base 1. The post arm 90 comprises an upper arm member 90A on which the head 50 is mounted, an intermediate arm member 90B secured to the upper arm member 90A, and a lower arm member 90C fixed to a main projector body 30 in the form of a rectangular box as viewed in elevation, the upper arm member 90A being slidably fittable over the lower arm member 90C while being guided by the intermediate arm member 90B. The head 50 supports a lens 12 and a light source 50 mounted therein, and a mirror 140 pivotally mounted thereon. The head 50 has a recess 140A defined in a side thereof for accommodating and protecting switches SW1, SW2 when the overhead projector is collapsed.

For collapsing the overhead projector from the position of FIG. 3, the mirror 140 is unlocked and swung in the direction of the arrow A, and then the head 50 is twisted in the direction of the arrow B. Thereafter, a release button 15 on the main projector body 30 is depressed to unlock the post arm 90, followed by pushing the head 50 toward the main projector body 30 in the direction of the arrow C. The upper arm member 90A is now fitted over the lower arm member 90C while being guided by the intermediate arm member 90B. A cord 5 connected to a power supply 4 in the main projector body 30 is stored in a storage space (not shown) similar to that illustrated in FIG. 5. When the head 50 is held against the main projector body 30, the switches SW1, SW2 are accommodated in the recess 140A.

Thereafter, the main projector body 30 is angularly moved against the base 1 in the direction of the arrow D, whereupon the overhead projector is completely collapsed as shown in FIG. 4.

The release button 15 is coupled to a stopper mechanism for selectively holding the post arm 90 in the extended and contracted positions.

Although certain preferred embodiments have been shown and described, it should be understood that many changes and modifications may be made therein without departing from the scope of the appended claims.

I claim:

1. An overhead projector comprising:

a base supporting a lens and serving as a document table;

a main projector body pivotally supported on said base by a first hinge means and formed as a substantially L-shaped box as viewed in elevation so as to define a recess;

a post arm pivotally supported on said main projector body by a second hinge means extending at a right angle to said first hinge means;

a head pivotally supported on said post arm by a third hinge means extending parallel with said first hinge means and having a mirror and a light source, said head being held in confronting relation to said base when the overhead projector is in use;

wherein said first hinge means is at the bottom of said L-shaped box and at one side of said base so that said base, said main projector body, said post arm, and said head are collapsible into a combined assembly with said head housed in said recess of said L-shaped box.

2. An overhead projector according to claim 1, wherein said base comprises a single thin rectangular plate.

3. An overhead projector according to claim 1, wherein said post arm is an enlongate member having a substantially C-shaped cross section.

4. An overhead projector according to claim 1, wherein said head is in the form of a box.

5. An overhead projector according to claim 1, wherein said post arm has a hook tab, and said base has a recess defined in a side thereof, said rectangular block and said base being held in mutual intimate contact by said hook tab engaging in said recess of said base.

6. An overhead projector according to claim 1, including a locking mechanism associated with each of said hinge means for locking said main projector body at an acute angle with respect to said base.

7. An overhead projector according to claim 1, wherein said main projector body has a first storage space for storing a power supply and a second storage space for storing a cord connected to said power supply.

8. An overhead projector according to claim 7, wherein said second storage space is in the form of an elongate recess defined in a surface of the main projector body remote from said base, said main projector body having a pair of bridge members extending across said elongate recess near its opposite ends for preventing the stored cord from being displaced out of said elongate recess.

9. An overhead projector according to claim 7, wherein said second storage space is defined in a surface of said main projector body which faces said base.

10. An overhead projector according to claim 9, wherein said main projector body has a guide groove defined adjacent to said second storage space for passing the cord therethrough.

11. An overhead projector according to claim 8, wherein said mirror is angularly movably joined to said head and has a locking tab, said main projector body having a recess defined adjacent to an upper end of one of said bridge members for lockingly receiving said locking tab.

12. An overhead projector according to claim 1, wherein said main projector body has a power supply switch and a lamp switch mounted on a side thereof which is covered with said post arm when the post arm is angularly movably coupled to said main projector body.

13. An overhead projector according to claim 7, wherein said main projector body has vent holes defined in side walls thereof surrounding the power supply stored in said first storage space.

14. An overhead projector according to claim 1, wherein said lens comprises a Fresnel lens.

* * * * *